May 26, 1931.   C. D. PAQUETTE   1,806,913
CONVEYER SAFETY DEVICE
Filed March 21, 1930   2 Sheets-Sheet 1
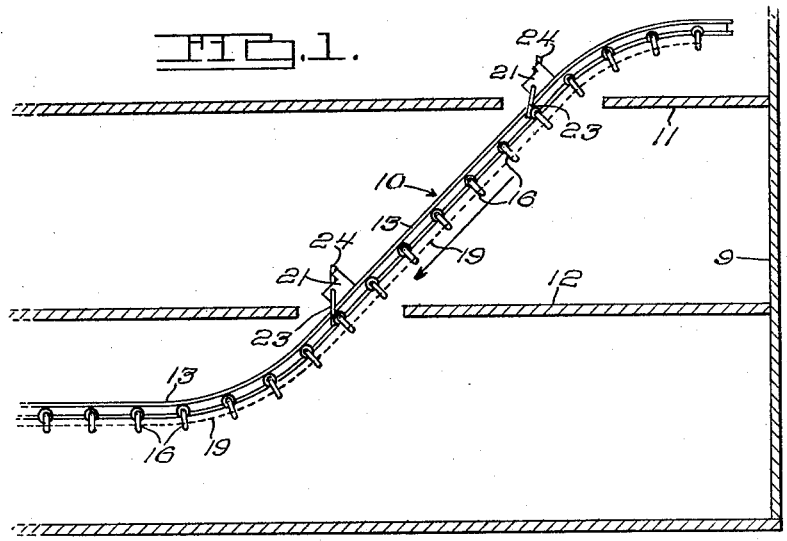
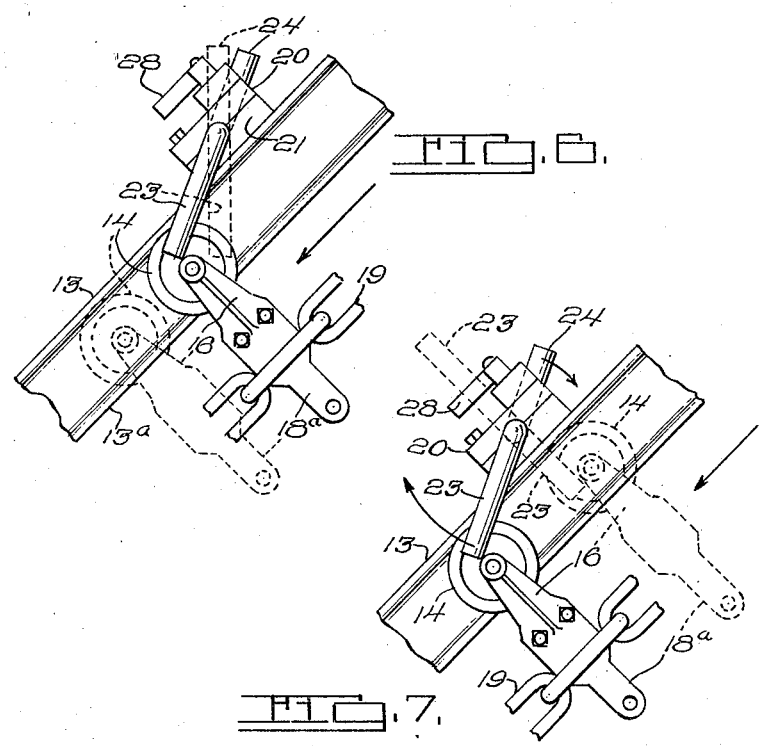
INVENTOR
Cyril D. Paquette
by Dike, Calver & Gray
ATTORNEY May 26, 1931. C. D. PAQUETTE 1,806,913
CONVEYER SAFETY DEVICE
Filed March 21, 1930  2 Sheets-Sheet 2
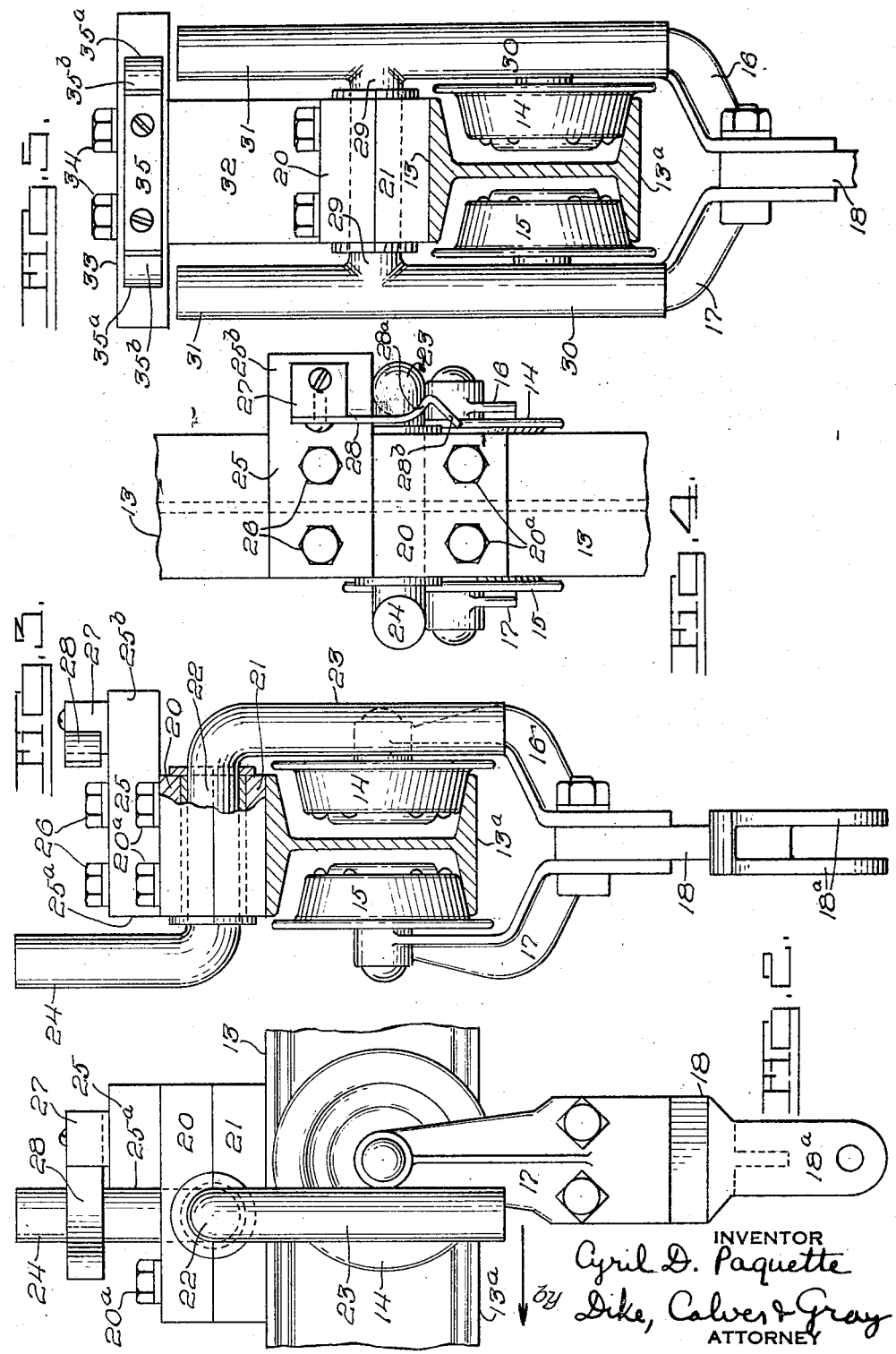

Patented May 26, 1931

1,806,913

UNITED STATES PATENT OFFICE

CYRIL D. PAQUETTE, OF DETROIT, MICHIGAN, ASSIGNOR TO KURTH & KNAPP MFG. CO., OF DETROIT, MICHIGAN, A CORPORATION OF MICHIGAN

CONVEYER SAFETY DEVICE

Application filed March 21, 1930. Serial No. 437,805.

This invention relates to safety mechanism for continuous or endless chain conveyers, the invention being particularly applicable for use in connection with mono-rail chain conveyers installed in factories, industrial plants, etc. These conveyers are commonly employed for transporting material, articles and parts from one part of the plant to another, and frequently from an upper level to a lower level in the building, and hence for this purpose the conveyer is provided with inclined runs for the downward travel of the moving chain from one floor or level to a lower floor or level of the plant building. Conventional installations of such conveyer systems include an endless chain supported from an overhead guide rail by means of a series of spaced trolleys which travel on the rail, and for the purpose of conveying material from one floor level to another the conveyer has an inclined run through, for instance, an opening in the floor. Articles are suspended from the endless chain which travels at a predetermined speed and conveys the articles from one point to another. In use serious accidents often occur due to breakage of the chain. When this happens the chain with its load is suddenly released at the point of the break, and unless stopped the conveyer will travel down the inclined runs at very great speed causing serious injury to workmen as well as damage to material.

An object of the present invention is to provide a safety device for a down travel conveyer, which is relatively simple and inexpensive in construction, which may be readily and easily installed in such conveyers, and which is adapted to arrest and prevent downward travel of the conveyer, when the chain breaks.

A further object is to provide a safety device for an endless chain conveyer which is adapted to be actuated by the conveyer itself when the chain breaks on an inclined run, and which is controlled by the speed of travel of the conveyer.

Other objects of this invention will appear in the following description and appended claims, reference being had to the accompanying drawings forming a part of this specification wherein like reference characters designate corresponding parts in the several views.

Fig. 1 is a diagrammatic view, partly in section, illustrating an application of the invention.

Fig. 2 is a fragmentary side elevation illustrating a safety device embodying the invention.

Fig. 3 is a front elevation, partly in section, of the construction shown in Fig. 2.

Fig. 4 is a plan view thereof.

Fig. 5 is a front elevation, partly in section, illustrating a modification.

Figs. 6 and 7 are fragmentary views of a conveyer embodying the invention and illustrating the method of operation.

Before explaining in detail the present invention it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended as considered in view of the prior art and the requirements thereof.

For the purposes of illustration the invention is applied to an endless chain conveyer of the mono-rail type and is particularly intended for use where the conveyer has inclined or downward runs from one level or floor of a plant to another. As shown in Fig. 1 the conveyer system may be installed in a plant building 9 having floors 11 and 12, and in order to illustrate a way in which the invention may be utilized, a stretch of the conveyer 10 may extend from the upper floor through openings in the floors 11 and 12 to the lower floor of the building. On these downward stretches of the conveyer there are installed a suitable number of safety devices according to the present invention.

Referring to Figs. 2, 3 and 4, the conveyer 10 comprises a guide rail 13, usually in the form of I-beam sections. The endless chain is supported by a series of trolleys each of which may comprise a pair of trolley wheels 14 and 15 traveling on tracks formed by the opposite inner faces of the lower flange 13a of the guide rail. The trolley wheels are journaled in the ends of yoke members 16 and 17, the lower ends of which are bolted to a hanger 18, and to the lower end 18a of the member 18 there may be connected a hook or other device for suspending articles to be transported on the conveyer. The chain 19 of the conveyer is connected to the several hanger members 18 in any suitable manner.

Secured at desired points to the top of the rail 13 are safety devices, according to the present invention, for stopping the down travel of the conveyer when the chain breaks. Each safety device may comprise a support made up of bearing blocks 20 and 21 bolted together at 20a, these blocks forming bearings for a rotatable member 22 which is journaled therein. The device 22 preferably comprises a pair of oppositely or reversely extending crank arms 23 and 24 which are capable of swinging in vertical planes at opposite sides of the guide rail 13 and trolley wheels 14 and 15. Each of these arms is of a length sufficient to extend, at predetermined times, into the path of one of the yoke members 16 or 17 of each trolley.

In the present instance the crank arm 23 of the safety device is substantially longer than the arm 24 so as to provide a means for maintaining the device normally in unbalanced condition, with the arm 23 held in downward position in the path of the yoke members 16 of the trolleys. Since the arm 23 of the safety device at one side of the pivot is of greater weight than the shorter arm 24 at the opposite side, the tendency of the device after every partial rotation or oscillation is to revert normally to the positions of the arms as shown in Fig. 3, due to this differential weight of the crank arms. Consequently, the force required to swing the arm 23 upwardly through an arc of 180 degrees from the position of Fig. 3 is dependent upon this differential weight and the speed of travel of the conveyer at the moment of impact of the trolley with the arm 23. In practice this differential weight is calculated in accordance with the predetermined normal speed of travel of the conveyer, the purpose being that under normal conditions of operation the trolleys will successively contact with the arm 23 with only sufficient force of impact to swing the arm intermittently out of their path; but whenever the chain breaks on or adjacent the incline, the sudden acceleration in the speed of travel of the conveyer will result in the trolley striking the arm 23 with sufficiently greater force of impact effective to swing it through an arc of substantially 180 degrees, thereby swinging arm 24 directly into the path of the next succeeding trolley.

Mounted on the supporting member 20 is a block 25 which is bolted thereto at 26. One end 25a of the block 25 is flush with the corresponding end of the member 20 so as to permit the crank arm 24 to swing freely past the end of the block 25. The opposite end 25b of this block overhangs the crank arm 23 and forms a stop for limiting the swinging movement thereof.

From the foregoing construction it will be seen that the arm 23 has a predetermined range of swinging movement, namely, until it swings upwardly into vertical position and strikes the overhanging stop 25b. When moved to this point the positions of the crank arms 23 and 24 are reversed, and the arm 24 is then shifted into the path of one of the trolley yokes 17. The arm 23 may be locked in vertical position when swung against the stop 25 by means of a spring device comprising in the present instance a member 27 secured to the upper face of the stop 25 and a leaf spring 28 secured thereto and projecting forwardly. This spring has a curved portion 28a effective to clamp the arm 23 in position, and terminates forwardly thereof in a cam portion 28b.

The operation of the safety device will be readily understood by reference to Figs. 6 and 7 in which the conveyer is illustrated as traveling on an inclined run. Since the conveyer normally travels at a predetermined speed the trolleys 16 will successively strike the depending arm 23 of each safety device. The arm will be thrust out of the path of the trolley and will be swung into the position shown in full lines in Fig. 6. When the trolley passes beneath the end of the arm the latter will swing back into the dotted line position. Thus during the normal travel of the conveyer the safety device will not operate to arrest or retard the travel of the conveyer, the arm 23 simply acting as an idler which rides up over the end of the trolley. When, however, the conveyer chain breaks, the chain and its load are released, resulting in a sudden increase in speed of travel of the chain and trolleys. When this occurs the trolley will strike the arm 23 with a sudden impact and with sufficient force and momentum to rotate the arm into the dotted line position shown in Fig. 7. The arm will strike the spring latch 28 and will be locked thereby in position against the stop 25b. During this movement the opposite crank arm 24 is rotated downwardly, as shown in Fig. 7, to the dotted line position in the path of the trolleys. Consequently, the succeeding trolley will strike the arm 24 and the travel of the conveyer will be arrested due to the limitation of rotation of the safety device by contact of arm 23 with the fixed stop 25.

In Fig. 5 there is illustrated a modified form of the invention in which the stop device proper comprises a pivot 29 journaled in the bearing blocks 20, 21, and having pairs of oppositely or reversely extending crank arms 30 and 31. The arms 30 in this instance are also longer than the arms 31, and the device is thereby normally unbalanced so as to cause the arms 30 normally to depend in the path of the trolleys. Mounted on the bearing block 20 is an upright 32 carrying at its top a crosspiece 33 located above the upper ends of the arms 31 but in position to be engaged by the longer arms 30. The crosspiece 33 is bolted at 34 to the top of the upright 32 and carries at its front face a spring bar 35 formed at opposite ends with latch members 35a and cam portions 35b in position to be engaged by the arms 30. The construction and operation of the spring device 35 may be substantially the same as described in connection with the device 28, and the operation of the safety device shown in Fig. 5 is the same as that described above in connection with Figs. 6 and 7. The construction illustrated in Fig. 5, however, is desirable under conditions where greater strength and rigidity are necessary to withstand severe impacts due to unusual acceleration in speed of travel of the conveyer when the chain breaks.

In practice the conveyer is electrically driven through suitable power mechanism, and the present invention also includes the provision of means actuated by the safety device for cutting off the power when the safety device is operated to stop the conveyer upon breakage of the chain. A switch (not shown) is operatively associated with the safety device, comprising a fixed and a movable contact member, the movable contact member of the switch being carried by the spring 28. Hence, when the arm 23 is rotated into the dotted line position of Fig. 7, it strikes the cam face 28b of the spring, shifting it laterally and thereby moving the contact member carried by the spring, breaking the circuit and shutting off the power. This stops the travel of the conveyer above the point where the chain breaks.

I claim:

1. In a traveling chain conveyer, a safety mechanism comprising a member normally in the path of the conveyer and a stop device normally out of the path thereof and actuated by said member, said member being adapted to shift said stop device into position to stop the conveyer upon predetermined increase in the speed of travel of the conveyer.

2. In a safety mechanism for a chain conveyer, a device freely shiftable into and out of the path of the conveyer during the normal travel thereof and adapted to be actuated by predetermined increased speed of travel of the conveyer to lock the same against travel.

3. A safety device for a down travel endless chain conveyer, comprising a device having a pair of shiftable members, one normally in the path of the conveyer and the other normally out of the path thereof, and means whereby said last member will be shifted into position to stop the conveyer only upon predetermined movement of the first member.

4. In a conveyer, the combination of a chain, a guide rail, trolleys supporting said chain and traveling on said rail, a shiftable device comprising a member in position to be intermittently shifted by said trolleys without stopping the travel thereof, and a stop member normally out of the path of said trolleys and adapted to be shifted into engagement with any one of said trolleys to stop the conveyer upon predetermined movement of said first member.

5. A safety device for an endless chain conveyer, comprising a device having oppositely extending members, means for pivotally mounting said device intermediate said members whereby one member swings normally into and out of the path of the conveyer, and means for limiting the swinging movement of said device when the other member is swung into the path of the conveyer.

6. A safety device for an endless chain conveyer, comprising an unbalanced pivoted device having means normally held out of the path of the chain and shiftable into the path thereof to lock it against movement at predetermined times.

7. A safety device for a trolley supported endless chain conveyer, comprising a support, a member pivoted thereto and having oppositely extending crank arms, means for normally maintaining one of said crank arms in swinging contact with the conveyer, and means for maintaining the member against movement when the other crank arm is swung into the patch of the conveyer.

8. A safety device for a trolley supported endless chain conveyer, comprising a support, a member pivoted thereto and having oppositely extending crank arms, counterbalancing means for normally maintaining one of said arms in the path of the conveyer, means for limiting the range of swinging movement of said arm when the other arm reaches a position in the path of the conveyer.

9. A safety device for a trolley supported endless chain conveyer, comprising a support, a member pivoted thereto and having oppositely extending crank arms of different lengths adapted to swing at opposite sides of the chain into the path of the trolleys, the longer crank arm normally swinging into and out of the path thereof, and means for stopping the member when the shorter crank arm swings into the path of a trolley.

10. A safety means for limiting the downward travel of a chain conveyer, comprising a device pivoted intermediate its ends and unbalanced to cause one end thereof normally to oscillate back and forth in the path of the conveyer, said device being effective to stop the conveyer upon application of a counteracting force on said device sufficient to swing the opposite end of the device into the path of the conveyer.

11. A safety mechanism for an inclined traveling chain conveyer, comprising a device having reversely extending members, one normally movable back and forth in the path of the conveyer and the other out of the path thereof, and means whereby upon reversing the positions of said members said device will stop the conveyer.

12. A safety mechanism for an inclined traveling chain conveyer, comprising a swinging member intermittently contacting with the conveyer without retarding its travel, means providing a limit for the swinging movement of said member, and a device operated by said member to stop the travel of the conveyer when the member is shifted to its limit of swinging movement.

13. A safety mechanism for an inclined traveling chain conveyer, comprising a member movably supported in the path of the conveyer and intermittently shifted thereby, and a device actuated by said member and movable into the path of the conveyer to stop the travel thereof when said member is shifted by the conveyer to a predetermined position.

14. A safety mechanism for an inclined traveling conveyer, comprising a pair of reversely extending members, means for normally maintaining one of said members in position to be intermittently shifted back and forth by the conveyer during its travel, and means whereby said other member will stop the conveyer upon reversing the positions of said members.

15. In a conveyer, comprising an endless chain, a guide rail and trolleys supporting said chain and traveling on the rail, the combination of a support mounted on said rail, a device pivoted to said support and having reversely extending arms adapted to swing at opposite sides of the rail, means for maintaining one of said arm in position to be intermittently engaged by the trolleys, said device being effective to stop the conveyer upon breaking of the chain due to the application of a force on said last arm sufficient to reverse the position of the device and swing the other arm into the path of a trolley, and a stop carried by said support for maintaining the device in position to stop the conveyer.

16. In a conveyer, comprising an endless chain, a guide rail and trolleys supporting said chain and traveling on the rail, the combination of a support mounted on said rail, a device pivoted to said support and having reversely extending arms adapted to swing at opposite sides of the rail, means for maintaining one of said arms in position to be intermittently engaged by the trolleys, said device being effective to stop the conveyer upon breaking of the chain due to the application of a force on said last arm sufficient to reverse the position of the device and swing the other arm into the path of a trolley, and a stop carried by said support for maintaining the device in position to stop the conveyer, and a spring device for releasably locking one of said arms in said last named position.

In testimony whereof I affix my signature.

CYRIL D. PAQUETTE.